US012620921B2

(12) United States Patent
Chen et al.

(10) Patent No.: US 12,620,921 B2
(45) Date of Patent: May 5, 2026

(54) MOTOR ROTATIONAL SPEED CONTROL SYSTEM AND METHOD HAVING DUTY CYCLE VARIABLE MODULATION MECHANISM

(71) Applicant: ANPEC ELECTRONICS CORPORATION, Hsinchu (TW)

(72) Inventors: Kun-Min Chen, Hsinchu City (TW); Shih-Hai Chien, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 194 days.

(21) Appl. No.: 18/601,978

(22) Filed: Mar. 11, 2024

(65) Prior Publication Data

US 2025/0202400 A1 Jun. 19, 2025

(30) Foreign Application Priority Data

Dec. 19, 2023 (TW) .................................. 112149377

(51) Int. Cl.
| | |
|---|---|
| *H02P 23/20* | (2016.01) |
| *H02P 23/14* | (2006.01) |
| *H02P 25/022* | (2016.01) |
| *H02P 25/04* | (2006.01) |

(52) U.S. Cl.
CPC .............. *H02P 23/20* (2016.02); *H02P 23/14* (2013.01); *H02P 25/022* (2013.01); *H02P 25/04* (2013.01)

(58) Field of Classification Search
CPC ........ H02P 23/20; H02P 23/14; H02P 25/022; H02P 25/04; H02P 6/06; H02P 6/17; H02P 27/085
USPC ......................................... 318/494, 599, 560
See application file for complete search history.

(56) References Cited

U.S. PATENT DOCUMENTS

| | | | | |
|---|---|---|---|---|
| 5,717,298 A * | 2/1998 | Tang | ........................ | H02P 6/182 |
| | | | | 318/431 |
| 9,685,894 B2 * | 6/2017 | Hano | ......................... | H02P 6/15 |
| 10,243,488 B2 * | 3/2019 | Yabuguchi | ............. | H02P 29/027 |
| 11,469,701 B2 * | 10/2022 | Eng | ........................... | H02P 6/26 |

* cited by examiner

*Primary Examiner* — David Luo
(74) *Attorney, Agent, or Firm* — Li & Cai Intellectual Property Office

(57) ABSTRACT

A motor rotational speed control system and method having a duty cycle variable modulation mechanism is provided. The motor rotational speed control system is performed by the motor rotational speed control system including a motor rotational speed detector and a motor driver. When a rotational speed of a motor detected by the motor rotational speed detector is larger than or equal to a set rotational speed, the motor driver modulates duty cycles of a plurality of waveforms of an on-time signal, and modulates a duty cycle difference between the duty cycle of each of the plurality of waveforms and the duty cycle of a previous one or every other one of the plurality of waveforms in the on-time signal. The motor driver, according to the on-time signal, drives the motor such that the rotational speed of the motor is limited to be smaller than the set rotational speed.

17 Claims, 8 Drawing Sheets

MOTOR ROTATIONAL SPEED CONTROL SYSTEM AND METHOD HAVING DUTY CYCLE VARIABLE MODULATION MECHANISM

CROSS-REFERENCE TO RELATED PATENT APPLICATION

This application claims the benefit of priority to Taiwan Patent Application No. 112149377, filed on Dec. 19, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor rotational speed control system and method, and more particularly to a motor rotational speed control system and method having a duty cycle variable modulation mechanism.

BACKGROUND OF THE DISCLOSURE

In electronic devices, fans are used to cool heat generating components such as processors. When the heat generating components are cooled down by the fan, a rotational speed of a motor of the fan must be limited to an appropriate value such that the fans can properly cool down the heat generating components with high efficiency. However, when the motor is driven such that the rotational speed of the motor is limited by a conventional motor controller, the motor is prone to unstable or abnormal operations.

SUMMARY OF THE DISCLOSURE

In response to the above-referenced technical inadequacies, the present disclosure provides a motor rotational speed control system having a duty cycle variable modulation mechanism. The motor rotational speed control system includes a rotational speed detector and a motor driver. The rotational speed detector is connected to a motor. The rotational speed detector is configured to detect a rotational speed of the motor. The motor driver is connected to the rotational speed detector and the motor. When the rotational speed of the motor that is detected by the rotational speed detector is larger than or equal to a set rotational speed, the motor driver, according to the rotational speed of the motor, modulates duty cycles of a plurality of waveforms that are sequentially generated in an on-time signal, and modulates a duty cycle difference between the duty cycle of each of the plurality of waveforms and the duty cycle of a previous one or every other one of the plurality of waveforms in the on-time signal. The motor driver, according to the on-time signal that is modulated, drives the motor such that the rotational speed of the motor is limited to be smaller than the set rotational speed.

In order to solve the above-mentioned problems, one of the technical aspects adopted by the present disclosure is to provide a motor rotational speed control method having a duty cycle variable modulation mechanism. The motor rotational speed control method includes processes of: (a) using a motor driver to drive a motor according to an on-time signal; (b) receiving a target duty cycle command by the motor driver; (c) setting, by the motor driver, a duty cycle of a latest one of a plurality of waveforms of the on-time signal to be equal to a target duty cycle instructed by the target duty cycle command; (d) detecting a rotational speed of the motor by a rotational speed detector; (e) determining, by the motor driver, whether or not the rotational speed of the motor is larger than or equal to a rotational speed limit value, in response to determining that the rotational speed of the motor is not larger than or equal to the rotational speed limit value, sequentially performing the processes (f) to (g) and then performing the process (l), and in response to determining that the rotational speed of the motor is larger than and not equal to the rotational speed limit value, sequentially performing the processes (h) to (j); (f) modulating, by the motor driver, the duty cycle difference between the duty cycle of each of the plurality of waveforms that are generated in the on-time signal within each of a plurality of time intervals and the duty cycle of each of the plurality of waveforms that are generated in the on-time signal within a next one of the plurality of time intervals to be equal to an initial duty cycle difference; (g) driving the motor according to the on-time signal having the duty cycle difference being equal to the initial duty cycle difference, by the motor driver; (h) setting, by the motor driver, the duty cycle difference between the duty cycles of each subsequent two of the plurality of waveforms of the on-time signal to be equal to a duty cycle modulation difference, wherein the duty cycle modulation difference is smaller than the initial duty cycle difference; (i) driving the motor according to the on-time signal having the duty cycle difference being equal to the duty cycle modulation difference, by the motor driver; (j) determining, by the motor driver, whether or not the rotational speed of the motor is larger than or equal to the rotational speed limit value, in response to determining that the rotational speed of the motor is larger than or equal to the rotational speed limit value, performing the process (k), and in response to determining that the rotational speed of the motor is not larger than and not equal to the rotational speed limit value, performing the process (l); (k) reducing the duty cycles of subsequent ones of the plurality of waveforms of the on-time signal for driving the motor, by the motor driver; (l) determining, by the motor driver, whether or not the duty cycle of one of the plurality of waveforms of the on-time signal that is currently used for driving the motor is equal to a target duty cycle, in response to determining that the duty cycle of the one of the plurality of waveforms of the on-time signal is equal to the target duty cycle, not performing the process (m) in which the on-time signal is further modulated, and in response to determining that the duty cycle of the one of the plurality of waveforms of the on-time signal is not equal to the target duty cycle, performing the process (m); and (m) determining, by the motor driver, whether or not the duty cycle of the one of the plurality of waveforms of the on-time signal is larger than the target duty cycle, in response to determining that the duty cycle of the one of the plurality of waveforms of the on-time signal is larger than the target duty cycle, reducing the duty cycles of the subsequent ones of the plurality of waveforms of the on-time signal for driving the motor, and in response to determining that the duty cycle of the one of the plurality of waveforms of the on-time signal is not larger than the target duty cycle, increasing the duty cycles of the subsequent ones of the plurality of waveforms of the on-time signal for driving the motor.

As described above, the present disclosure provides the motor rotational speed control system and method having the duty cycle variable modulation mechanism. The motor rotational speed control system (including the rotational speed detector and the motor driver) of the present disclosure is capable of performing the motor rotational speed control method of the present disclosure. In the motor speed control method of the present disclosure, a hysteresis operation in which the rotational speed of the motor speed is limited to being unable to quickly reach the target speed is not performed. In the motor speed control method of the present disclosure, the duty cycle of each of the plurality of waveforms of the on-time signal used for driving the motor is modulated, and the duty cycle differences between the duty cycles of the plurality of waveforms of the on-time signal are modulated, with changes in various conditions and environmental factors. Therefore, the motor that is driven according to the motor speed control method of the present disclosure rotates stably.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
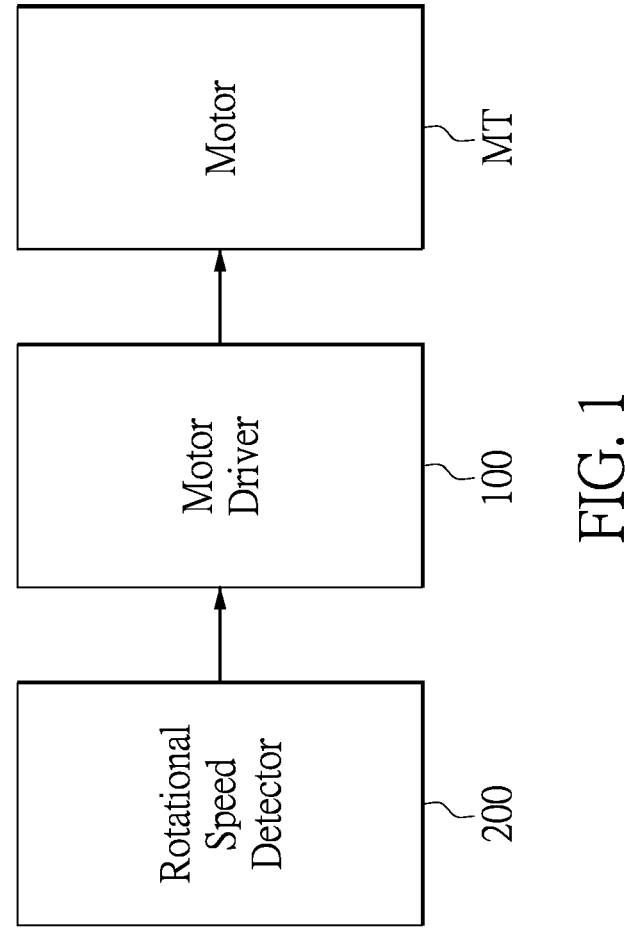
FIG. 1 is a block diagram of a motor rotational speed control system having a duty cycle variable modulation mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a motor rotational speed control system having a duty cycle variable modulation mechanism according to a first embodiment of the present disclosure. The motor rotational speed control system of the first embodiment of the present disclosure is applied to drive a motor MT.

In the first embodiment, the motor rotational speed control system of the present disclosure includes a rotational speed detector 200 and a motor driver 100. The motor driver 100 is connected to the rotational speed detector 200 and the motor MT.

When the motor driver 100 drives the motor MT, the rotational speed detector 200 detects a rotational speed RPM of the motor MT.

The motor driver 100, according to the rotational speed RPM of the motor MT that is detected by the rotational speed detector 200, modulates duty cycles of a plurality of waveforms that are sequentially generated in an on-time signal, and modulates a duty cycle difference between the duty cycle of each of the plurality of waveforms and the duty cycle of a previous one or every other one of the plurality of waveforms in the on-time signal.

The motor driver 100 drives the motor MT according to the on-time signal. For example, the motor driver 100 drives the motor MT within a working period of each of the plurality of waveforms of the on-time signal, and does not drive the motor MT within a non-working period of each of the plurality of waveforms of the on-time signal.

Figure 2:
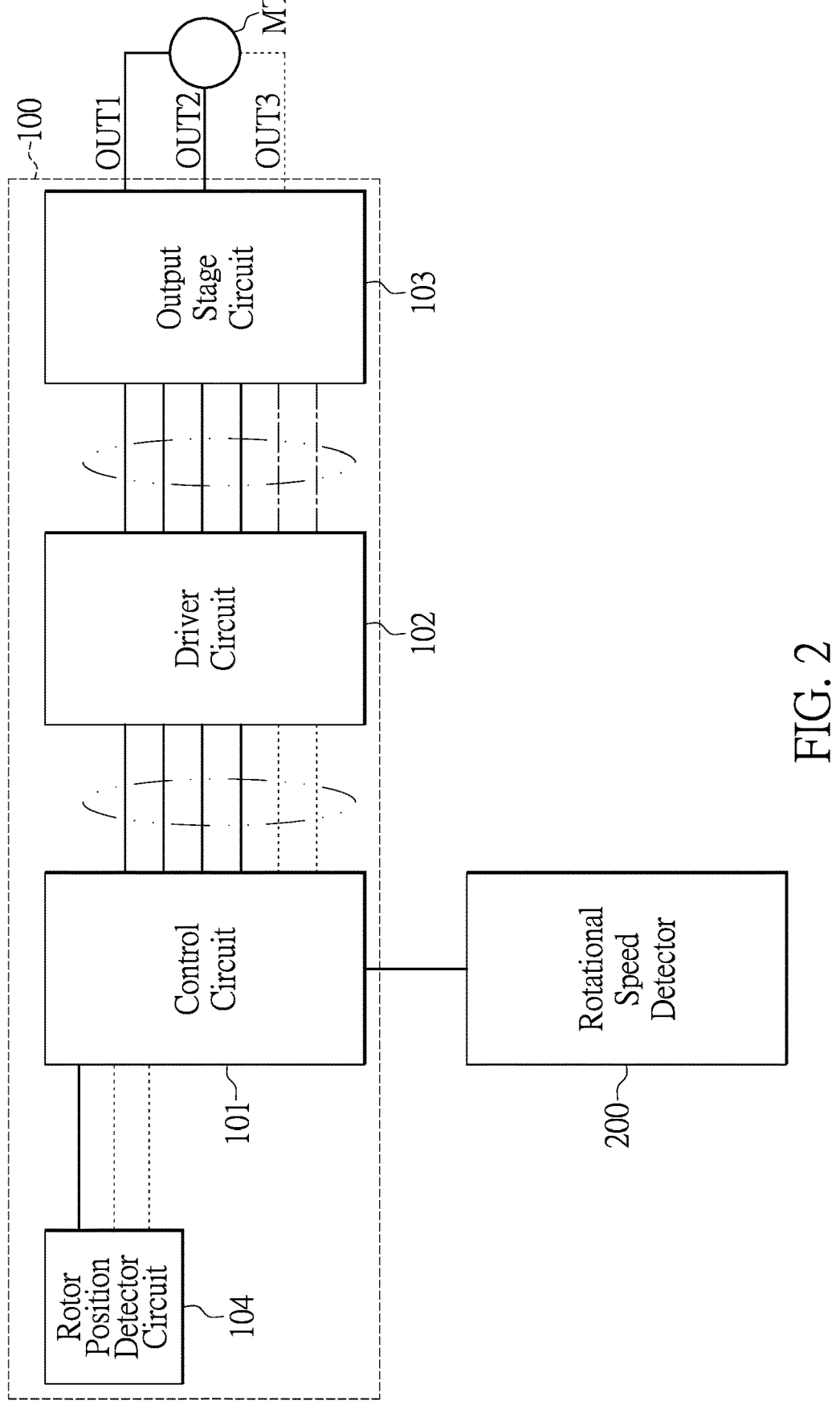
FIG. 2 is a block diagram of a motor rotational speed control system having a duty cycle variable modulation mechanism according to a second embodiment of the present disclosure.

Reference is made to FIG. 2, which is a block diagram of a motor rotational speed control system having a duty cycle variable modulation mechanism according to a second embodiment of the present disclosure. The motor rotational speed control system of the second embodiment of the present disclosure is applied to drive the motor MT.

In the second embodiment, the motor rotational speed control system of the present disclosure includes the rotational speed detector 200 and the motor driver 100. The motor driver 100 may include a control circuit 101, a driver circuit 102, an output stage circuit 103 and a rotor position detector circuit 104.

In the motor driver 100, the control circuit 101 is connected to the rotor position detector circuit 104 and the driver circuit 102, the output stage circuit 103 is connected to the driver circuit 102, and the output stage circuit 103 is connected to the motor MT. The rotor position detector circuit 104 may be disposed on the motor MT. The control circuit 101 is connected to the rotational speed detector 200.

The rotor position detector circuit 104 may detect a position of a rotor of the motor MT to output a rotor position detected signal. The control circuit 101 may, according to the position of the rotor of the motor MT that is instructed by the rotor position detected signal from the rotor position detector circuit 104, control the driver circuit 102 to drive the output stage circuit 103 so as to drive the motor MT.

When the control circuit 101 controls the driver circuit 102 to drive the output stage circuit 103 so as to drive the motor MT (according to the rotor position detected signal from the rotor position detector circuit 104), the rotational speed detector 200 may detect the rotational speed RPM of the motor MT.

For example, the rotor position detector circuit 104 may, according to the rotor position detected signal received from the rotor position detector circuit 104 for multiple times, determines changes in the position of the rotor of the motor MT and accordingly determines the rotational speed RPM of the motor MT.

It is worth noting that, when the rotational speed RPM of the motor MT that is detected by the rotational speed detector 200 is larger than or equal to a set rotational speed, the control circuit 101 may, according to the rotational speed RPM of the motor MT, modulate duty cycles of subsequent ones of a plurality of waveforms of each of a plurality of on-time signals, and may modulate a difference (that is the duty cycle difference described above) between the duty cycle of each of the plurality of waveforms and the duty cycle of a previous one or every other one of the plurality of waveforms in each of the plurality of on-time signals. The control circuit 101 may output a plurality of control signals according to the modulated on-time signals.

The driver circuit 102 outputs the plurality of on-time signals according to the plurality of control signals from the control circuit 101. The output stage circuit 103 operates according to the plurality of on-time signals from the driver circuit 102 so as to drive the motor MT such that the rotational speed RPM of the motor MT is limited to be smaller than the set rotational speed.

Figure 3:
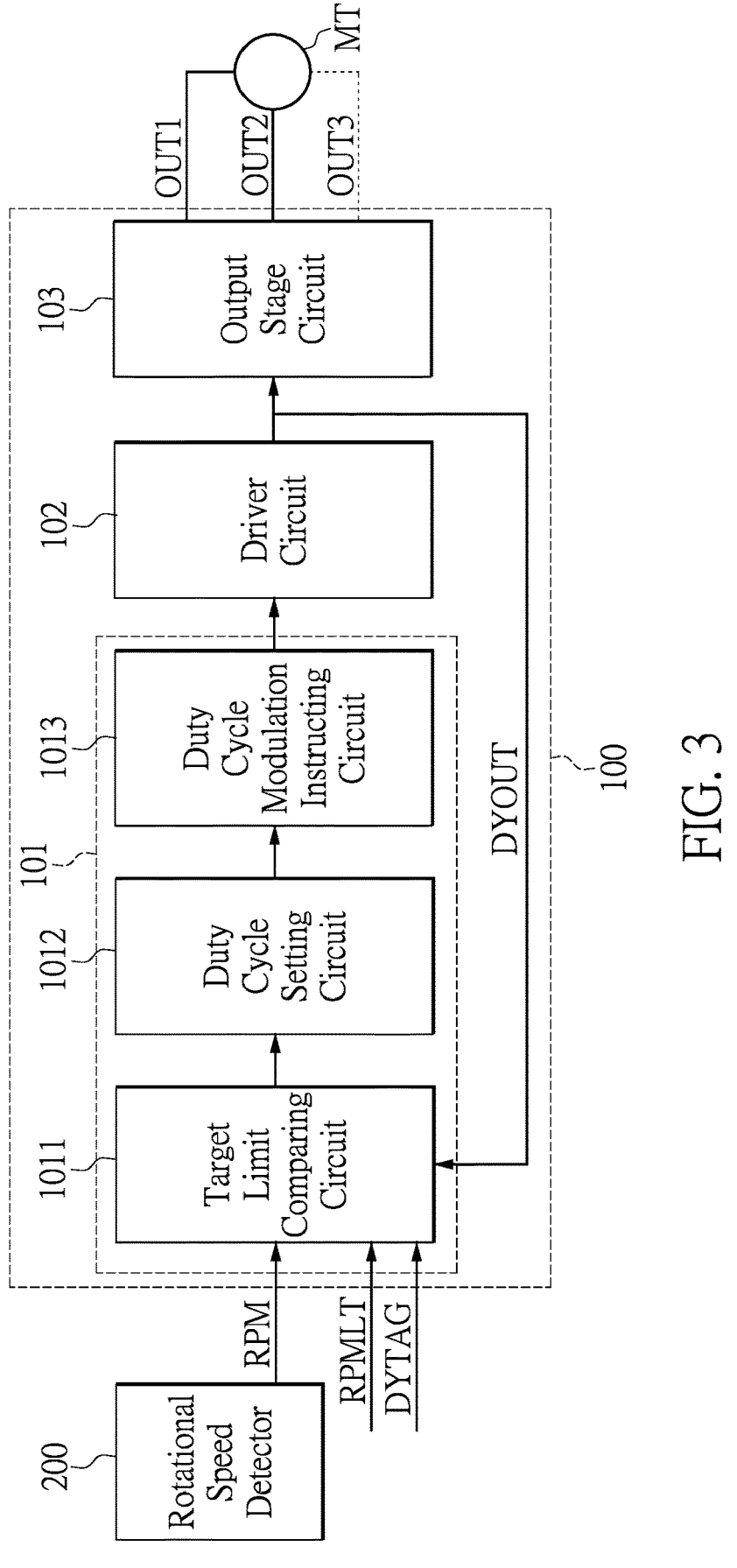
FIG. 3 is a block diagram of a motor rotational speed control system having a duty cycle variable modulation mechanism according to a third embodiment of the present disclosure.
Figure 4:
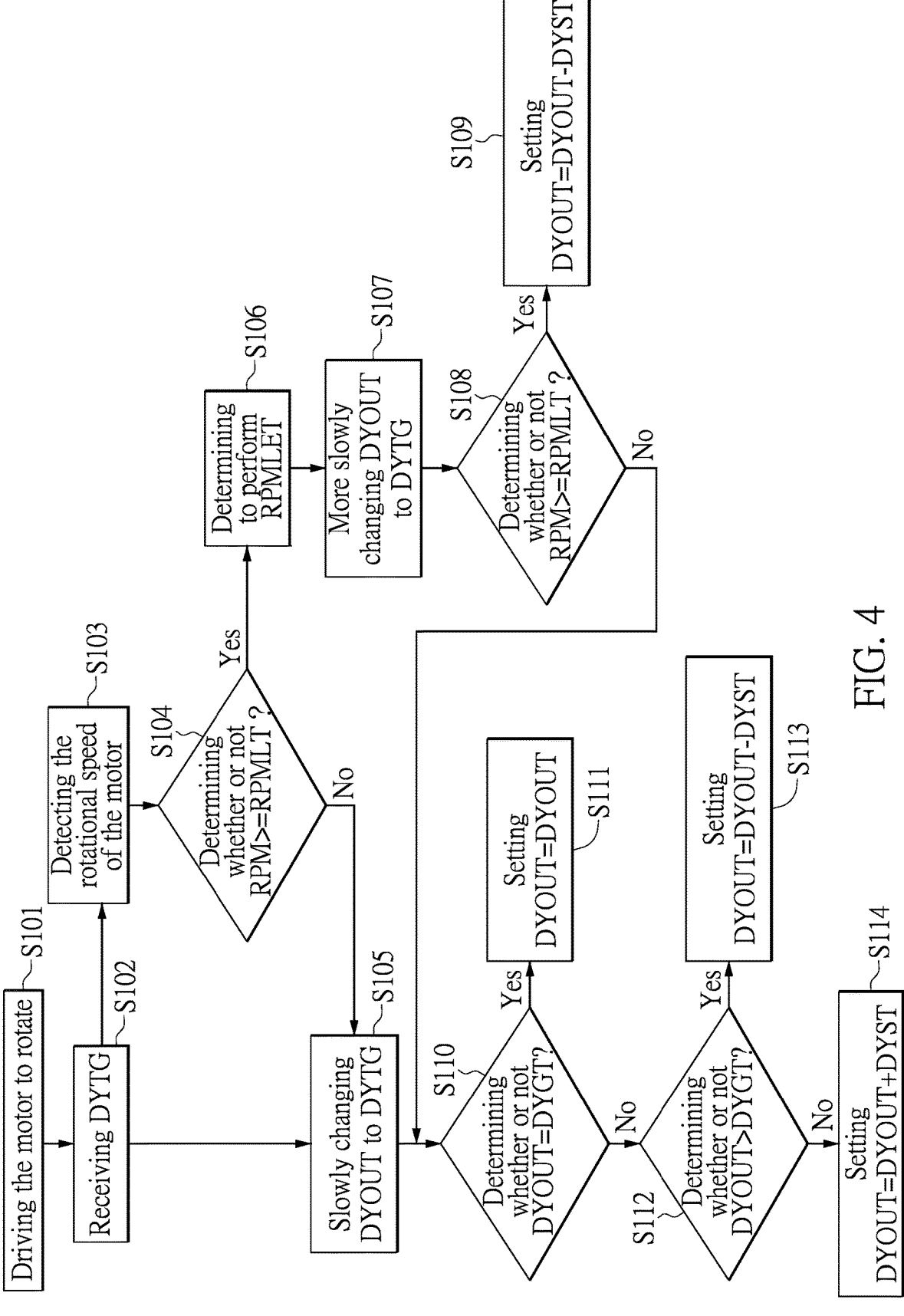
FIG. 4 is a flowchart diagram of a motor rotational speed control method having the duty cycle variable modulation mechanism according to the third embodiment of the present disclosure.

Reference is made to FIG. 3 and FIG. 4, in which FIG. 3 is a block diagram of a motor rotational speed control system having a duty cycle variable modulation mechanism according to a third embodiment of the present disclosure, and FIG. 4 is a flowchart diagram of the motor rotational speed control system having the duty cycle variable modulation mechanism according to the third embodiment of the present disclosure.

The motor rotational speed control system of the third embodiment of the present disclosure is applied to drive the motor MT.

In third embodiment, the motor rotational speed control system of the present disclosure includes the rotational speed detector 200 and the motor driver 100 as shown in FIG. 3. The motor driver 100 may include the control circuit 101, the driver circuit 102, the output stage circuit 103 and the rotor position detector circuit 104.

It is worth noting that, as shown in FIG. 3, the control circuit 101 of the motor rotational speed control system of the third embodiment of the present disclosure includes a target limit comparing circuit 1011, a duty cycle setting circuit 1012 and a duty cycle modulation instructing circuit 1013 for performing functions of the control circuit 101, but the present disclosure is not limited thereto.

The motor rotational speed control system of the present disclosure as shown in FIG. 3 may perform processes S101 to S114 as shown in FIG. 4, which are described in detail as follows.

In process S101, the duty cycle modulation instructing circuit 1013 of the control circuit 101, according to the on-time signal, drives the output stage circuit 103 to operate so as to drive the motor MT to normally rotate. At this time, the duty cycle difference between the duty cycle DYOUT of each of the plurality of waveforms that are generated in the on-time signal outputted to the output stage circuit 103 within each of a plurality of time intervals and the duty cycle DYOUT of each of the plurality of waveforms that are generated in the on-time signal within a next one of the plurality of time intervals is equal to a set duty cycle difference or a default duty cycle difference.

In process S102, the target limit comparing circuit 1011 of the control circuit 101 receives a target duty cycle command DYTAG from an external target limiting circuit and obtains a target duty cycle DYTG from the target duty cycle command DYTAG, or directly receives the target duty cycle DYTG from the external target limiting circuit. The target duty cycle DYTG is used for driving the motor MT such that the rotational speed RPM of the motor MT reaches a target rotational speed.

The duty cycle setting circuit 1012 of the control circuit 101 sets the duty cycle DYOUT of a latest one of the plurality of waveforms of the on-time signal to be equal to the target duty cycle DYTG.

In process S103, the rotational speed detector 200 detects the rotational speed RPM of the motor MT.

In process S104, the target limit comparing circuit 1011 of the control circuit 101 determines whether or not the rotational speed RPM of the motor MT is larger than or equal to a rotational speed limit value RPMLT. If the rotational speed RPM of the motor MT is not larger and not equal to the rotational speed limit value RPMLT, process S105 is performed. Conversely, if the rotational speed RPM of the motor MT is larger than or equal to the rotational speed limit value RPMLT, processes S106 and S107 are performed.

In process S105, the duty cycle setting circuit 1012 of the control circuit 101 sets the initial duty cycle difference. The duty cycle modulation instructing circuit 1013 of the control circuit 101 instructs the driver circuit 102 to modulate the duty cycle difference between the duty cycle DYOUT of each of the plurality of waveforms that are generated in the on-time signal within each of the plurality of time intervals and the duty cycle DYOUT of each of the plurality of waveforms that are generated in the on-time signal within a next one of the plurality of time intervals to be equal to the initial duty cycle difference.

The driver circuit 102 drives the output stage circuit 103 so as to drive the motor MT according to the on-time signal having the duty cycle difference being equal to the initial duty cycle difference.

That is, the duty cycle DYOUT of the on-time signal is gradually increased from an initial duty cycle of an earliest one of the plurality of waveforms of the on-time signal to the target duty cycle DYTG of the latest one of the plurality of waveforms of the on-time signal. Therefore, when the motor MT is driven according to the on-time signal, the rotational speed RPM of the motor MT is gradually increased from an initial rotational speed to the target rotational speed.

It should be understood that, the duty cycle difference between each two of the plurality of waveforms of the on-time signal described herein may be different from the duty cycle difference between other two ones of the plurality of waveforms of the on-time signal.

In process S106, when the rotational speed RPM of the motor MT is larger than or equal to the rotational speed limit value RPMLT, the target limit comparing circuit 1011 of the control circuit 101 determines to perform a duty cycle limit operation instructed by a duty cycle limit instruction signal RPMLET.

In process S107, the duty cycle limit operation is performed. In the duty cycle limit operation, the duty cycle setting circuit 1012 of the control circuit 101 sets a duty cycle modulation difference. The duty cycle modulation instructing circuit 1013 of the control circuit 101 instructs the driver circuit 102 to modulate the duty cycle difference between each subsequent two of the plurality of waveforms of the on-time signal to be equal to the duty cycle modulation difference.

The duty cycle modulation difference set in process S107 is smaller than the initial duty cycle difference set in process S105. Therefore, the duty cycle DYOUT of the on-time signal generated in process S107 is more slowly increased to reach the target duty cycle DYTG than that generated in process S105.

As a result, when the driver circuit 102 drives the output stage circuit 103 to operate so as to drive the motor MT according to the on-time signal having the duty cycle difference being equal to the duty cycle modulation difference in process S107, the rotational speed RPM of the motor MT is more slowly increased from the initial rotational speed to reach the target rotational speed.

In process S108, the target limit comparing circuit 1011 of the control circuit 101 determines whether or the rotational speed RPM of the motor MT is larger than or equal to the rotational speed limit value RPMLT (from the external target limiting circuit). If the rotational speed RPM of the motor MT is larger than or equal to the rotational speed limit value RPMLT, process S109 is performed. Conversely, if the rotational speed RPM of the motor MT is not larger than and not equal to the rotational speed limit value RPMLT, process S110 is performed.

In process S109, when the motor driver 100 drives the motor MT such that the rotational speed RPM of motor MT changes to be larger than or equal to the rotational speed limit value RPMLT according to the duty cycles of the plurality of waveforms of the on-time signal within one of the plurality of time intervals, the duty cycle modulation instructing circuit 1013 of the control circuit 101 of the motor driver 100 instructs the driver circuit 102 to reduce the duty cycles DYOUT of one or more of the plurality of waveforms of the on-time signal within a next one of the plurality of time intervals. As shown in FIG. 4, a duty cycle modulation value DYST is subtracted from the duty cycle DYOUT of the on-time signal for reducing the duty cycle DYOUT of the on-time signal.

In process S110, the target limit comparing circuit 1011 of the control circuit 101 determines whether or not the duty cycle DYOUT of one of the plurality of waveforms of the on-time signal that is currently used for driving the motor MT is equal to the target duty cycle DYTG obtained in process S102.

If the duty cycle DYOUT of the one of the plurality of waveforms of the on-time signal is equal to the target duty cycle DYTG, process S111 is performed. Conversely, if the duty cycle DYOUT of the one of the plurality of waveforms of the on-time signal is not equal to the target duty cycle DYTG, process S112 is performed.

In process S111, the target limit comparing circuit 1011 of the control circuit 101 determines not to further modulate the on-time signal.

In process S112, the target limit comparing circuit 1011 of the control circuit 101 determines whether or not the duty cycle DYOUT of the one of the plurality of waveforms of the on-time signal that is currently used for driving the motor MT is larger than the target duty cycle DYTG obtained in process S102.

If the duty cycle DYOUT of the one of the plurality of waveforms of the on-time signal that is currently used for driving the motor MT is larger than the target duty cycle DYTG, process S113 is performed. Conversely, if the duty cycle DYOUT of the one of the plurality of waveforms of the on-time signal that is currently used for driving the motor MT is not larger than the target duty cycle DYTG, process S114 is performed.

In process S113, the target limit comparing circuit 1011 of the control circuit 101 determines to further modulate the duty cycles DYOUT of subsequent ones of the plurality of waveforms of the on-time signal for driving the motor MT. The duty cycle setting circuit 1012 of the control circuit 101 sets the duty cycle modulation value DYST. The duty cycle modulation instructing circuit 1013 of the control circuit 101 instructs the driver circuit 102 to subtract the duty cycle modulation value DYST from the duty cycle DYOUT of each subsequent one or each specified one of the plurality of waveforms of the on-time signal.

In process S114, the target limit comparing circuit 1011 of the control circuit 101 determines to increase the duty cycle DYOUT of each subsequent one of the plurality of waveforms of the on-time signal for driving the motor MT. The duty cycle setting circuit 1012 of the control circuit 101 sets the duty cycle modulation value DYST. The duty cycle modulation instructing circuit 1013 of the control circuit 101 instructs the driver circuit 102 to add the duty cycle modulation value DYST to the duty cycle DYOUT of each subsequent one or each specified one of the plurality of waveforms of the on-time signal.

Figure 5:
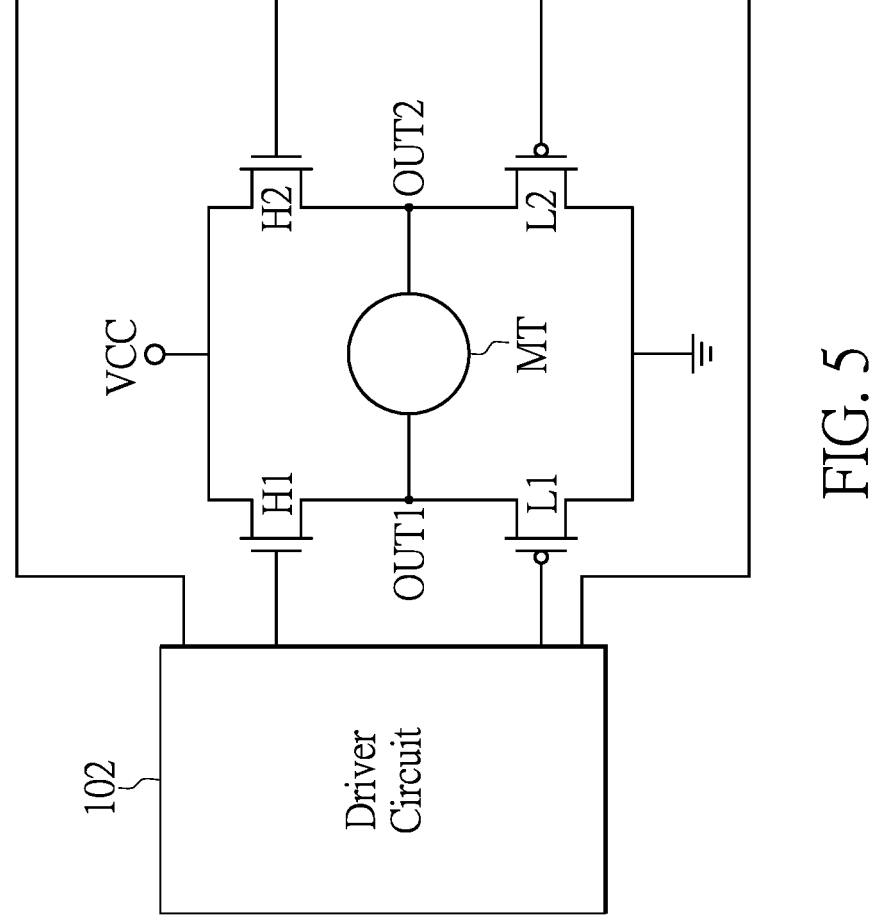
FIG. 5 is a circuit diagram of an output stage circuit and a driver circuit of a motor rotational speed control system having a duty cycle variable modulation mechanism and a single-phase motor according to a fourth embodiment of the present disclosure.

Reference is made to FIG. 5, which is a circuit diagram of an output stage circuit and a driver circuit of a motor rotational speed control system having a duty cycle variable modulation mechanism and a single-phase motor according to a fourth embodiment of the present disclosure.

The motor MT driven by the motor driver 100 of the motor rotational speed control system of the present disclosure as shown in FIG. 2 and FIG. 3 may be a single-phase motor as shown in FIG. 5.

If the motor MT driven by the motor driver 100 is the single-phase motor, an output stage circuit of a motor driver of the motor rotational speed control system of the present disclosure (such as the output stage circuit 103 as shown in FIG. 2 and FIG. 3) may include a first high-side switch H1, a first low-side switch L1, a second high-side switch H2 and a second low-side switch L2.

A first terminal of the first high-side switch H1 is coupled with a common voltage VCC. A first terminal of the first low-side switch L1 is connected to a second terminal of the first high-side switch H1. A second terminal of the first low-side switch L1 is grounded. A node between the first terminal of the first low-side switch L1 and the second terminal of the first high-side switch H1 is connected to a first terminal OUT1 of the motor MT.

A first terminal of the second high-side switch H2 is coupled with the common voltage VCC. A first terminal of the second low-side switch L2 is connected to a second terminal of the second high-side switch H2. A second terminal of the second low-side switch L2 is grounded. A node between the first terminal of the second low-side switch L2 and the second terminal of the second high-side switch H2 is connected to a second terminal OUT2 of the motor MT.

A control terminal of the first high-side switch H1, a control terminal of the first low-side switch L1, a control terminal of the second high-side switch H2 and a control terminal of the second low-side switch L2 are connected to an output terminal of the driver circuit 102.

The driver circuit 102, according to the plurality of control signals from the control circuit 101, outputs the plurality of on-time signals respectively to the control terminal of the first high-side switch H1, the control terminal of the first low-side switch L1, the control terminal of the second high-side switch H2 and the control terminal of the second low-side switch L2.

For example, the first high-side switch H1 as shown in FIG. 5 is turned on within working periods of the received on-time signal, and turned off within the non-working periods of the received on-time signal. The second high-side switch H2 as shown in FIG. 5 is also turned on within working periods of the received on-time signal, and turned off within the non-working periods of the received on-time signal. Conversely, the first low-side switch L1 as shown in FIG. 5 is turned on within non-working periods of the received on-time signal, and turned off within the working periods of the received on-time signal. The second low-side switch L2 as shown in FIG. 5 is also turned on within non-working periods of the received on-time signal, and turned off within the working periods of the received on-time signal.

Figure 6:
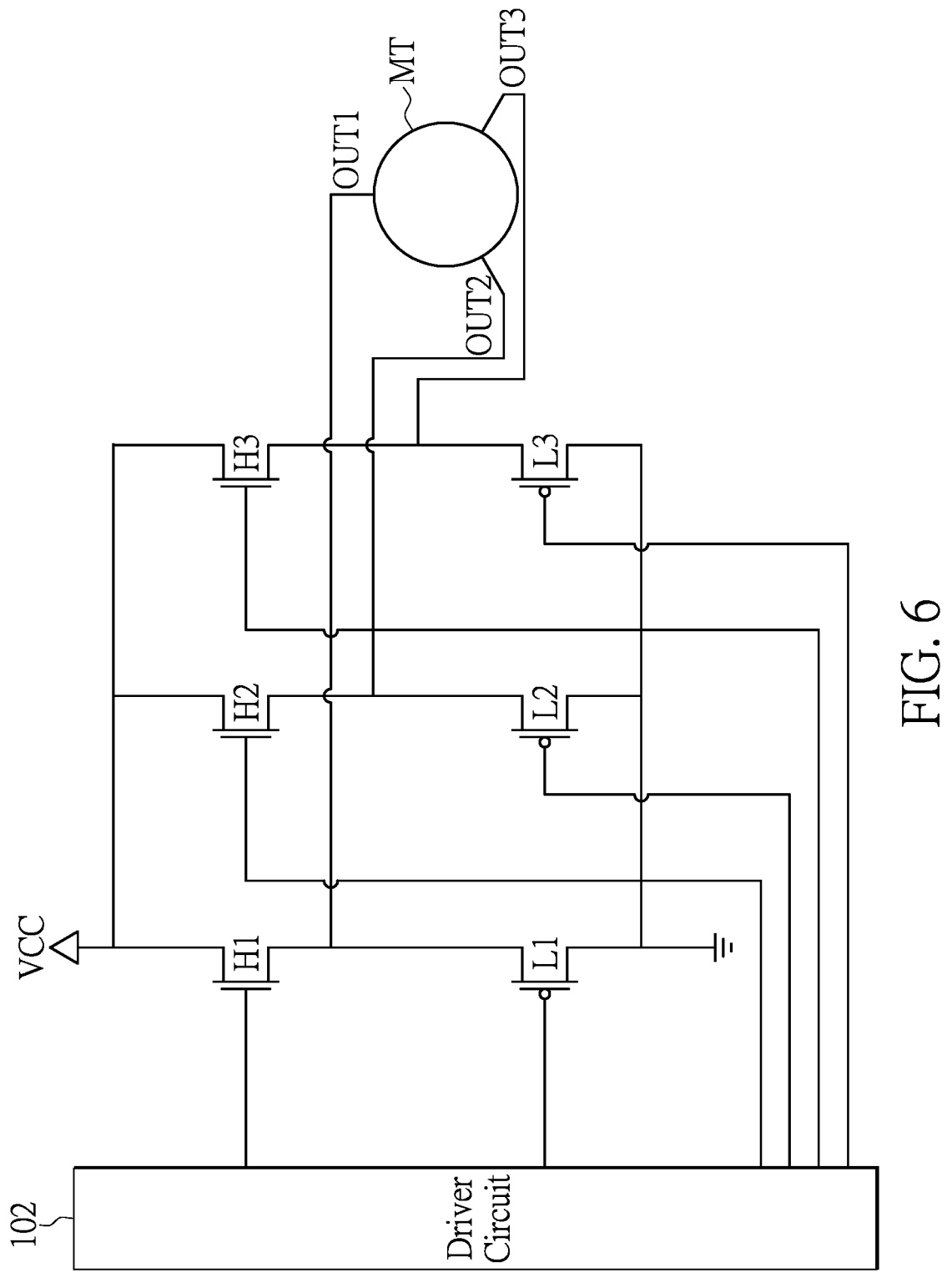
FIG. 6 is a circuit diagram of an output stage circuit and a driver circuit of a motor rotational speed control system having a duty cycle variable modulation mechanism and a three-phase motor according to a fifth embodiment of the present disclosure.

Reference is made to FIG. 6, which is a circuit diagram of an output stage circuit and a driver circuit of a motor rotational speed control system having a duty cycle variable modulation mechanism and a three-phase motor according to a fifth embodiment of the present disclosure.

The motor MT driven by the motor driver 100 of the motor rotational speed control system of the present disclosure as shown in FIG. 2 and FIG. 3 may be a three-phase motor as shown in FIG. 6.

If the motor MT driven by the motor driver 100 is the three-phase motor, the output stage circuit of the motor driver of the motor rotational speed control system of the present disclosure (such as the output stage circuit 103 as shown in FIG. 2 and FIG. 3) may include the first high-side switch H1, the first low-side switch L1, the second high-side switch H2, the second low-side switch L2, a third high-side switch H3 and a third low-side switch L3 as shown in FIG. 6.

The configurations of the first high-side switch H1, the first low-side switch L1, the second high-side switch H2 and the second low-side switch L2 as shown in FIG. 6 are the same as that described above and thus are not repeated in the following.

A first terminal of the third high-side switch H3 is coupled with the common voltage VCC. A first terminal of the third low-side switch L3 is connected to a second terminal of the third high-side switch H3. A second terminal of the third low-side switch L3 is grounded. A node between the first terminal of the third low-side switch L3 and the second terminal of the third high-side switch H3 is connected to a third terminal OUT3 of the motor MT.

The first terminal OUT1, the second terminal OUT2 and the third terminal OUT3 of the motor MT are a U-phase terminal, a V-phase terminal and a W-phase terminal of the three-phase motor respectively.

The control terminal of the first high-side switch H1, the control terminal of the first low-side switch L1, the control terminal of the second high-side switch H2, the control terminal of the second low-side switch L2, the control terminal of the third high-side switch H3 and the control terminal of third low-side switch L3 are connected to the output terminal of the driver circuit 102.

The driver circuit 102, according to the plurality of control signals from the control circuit 101, outputs the plurality of on-time signals respectively to the control terminal of the first high-side switch H1, the control terminal of the first low-side switch L1, the control terminal of the second high-side switch H2, the control terminal of the second low-side switch L2, the control terminal of the third high-side switch H3 and the control terminal of third low-side switch L3.

For example, the third high-side switch H3 as shown in FIG. 6 is turned on within the working period of the received on-time signal, and turned off within the non-working period of the received on-time signal. In addition, the third low-side switch L3 as shown in FIG. 6 is turned on within the non-working period of the received on-time signal, and turned off within the working period of the received on-time signal.

Figure 7:
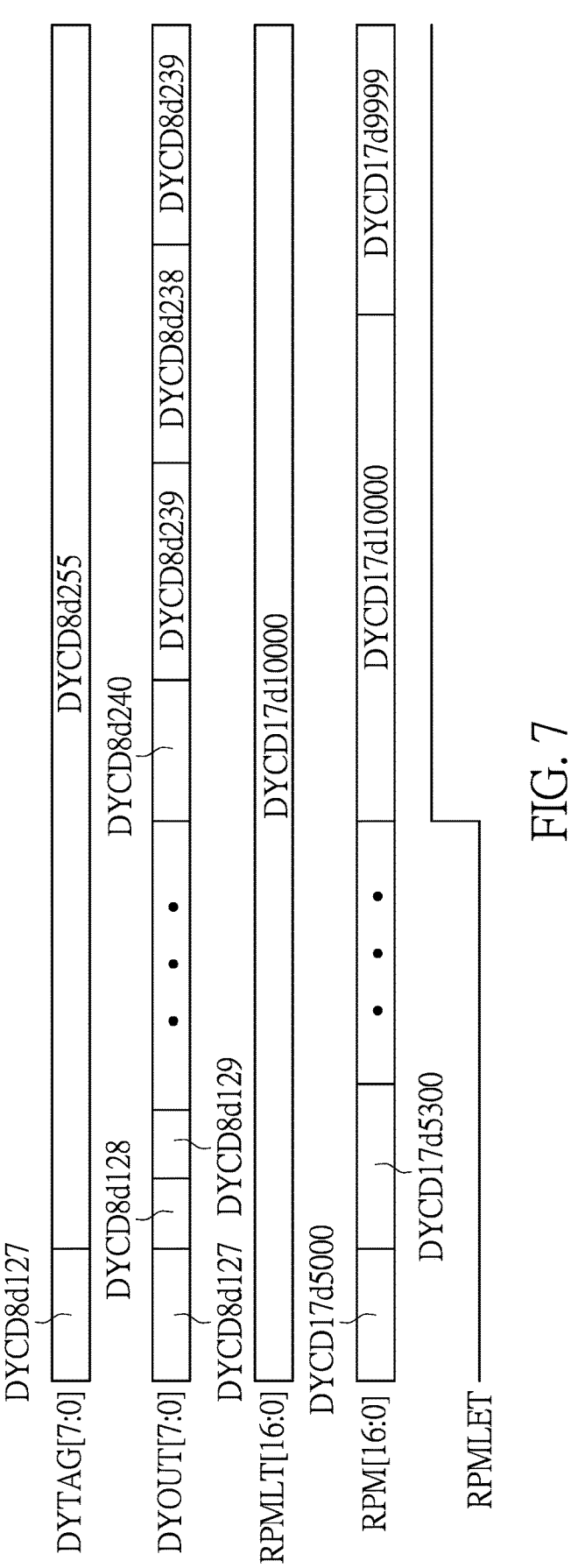
FIG. 7 is a schematic diagram of a time sequence of codes generated by a motor rotational speed control system having a duty cycle variable modulation mechanism in a rotational speed limited state according to a sixth embodiment of the present disclosure.

Reference is made to FIG. 7, which is a schematic diagram of a time sequence of codes generated by a motor rotational speed control system having a duty cycle variable modulation mechanism in a rotational speed limited state according to a sixth embodiment of the present disclosure.

The target duty cycle command DYTAG that is received from the external target limiting circuit by the target limit comparing circuit 1011 of the control circuit 101 of the motor rotational speed control system of the present disclosure as shown in FIG. 3 may include a code representing a target duty cycle. For example, as shown in FIG. 7, the target limit comparing circuit 1011 receives a code "DYCD8d127" representing the target duty cycle being equal to a first specific target duty cycle within one of the plurality of time intervals, and receives a code "DYCD8d255" representing the target duty cycle being equal to a second specific target duty cycle within a next one of the plurality of time intervals.

The target limit comparing circuit 1011 of the control circuit 101 may store a lookup table on which a plurality of target duty cycles and a plurality of codes that respectively represent the plurality of target duty cycles are listed. The target limit comparing circuit 1011 of the control circuit 101 may determine which one of the plurality of target duty cycles on the lookup table is equal to the target duty cycle (%) instructed by the target duty cycle command DYTAG, and then look for one of the plurality of codes that represents the one of the plurality of target duty cycles on the lookup table.

The plurality of duty cycles DYOUT of the on-time signal that are sequentially outputted to the output stage circuit 103 within the plurality of intervals are respectively represented by codes "DYCD8d127", "DYCD8d128", "DYCD8d129" to "DYCD8d240", "DYCD8d239", "DYCD8d238" and "DYCD8d239", and are fed back to the target limit comparing circuit 1011 of the control circuit 101.

The target limit comparing circuit 1011 of the control circuit 101 of the motor rotational speed control system of the present disclosure as shown in FIG. 3 receives a rotational speed limit command from the external target limiting circuit. The rotational speed limit command may include a code representing the rotational speed limit value RPMLT such as a code "DYCD17d10000" as shown in FIG. 7.

The rotational speed detector 200 may detect the rotational speed RPM of the motor MT and output the code representing the detected rotational speed RPM of the motor MT to the target limit comparing circuit 1011 of the control circuit 101.

When the detected rotational speed RPM of the motor MT that is represented by the code from the rotational speed detector 200 received by the target limit comparing circuit 1011 increases to be equal to or larger than the rotational speed limit value RPMLT represented by the code "DYCD17d10000", the target limit comparing circuit 1011 of the control circuit 101 outputs the duty cycle limit instruction signal RPMLET at a high level for instructing to perform the duty cycle limit operation. In the duty cycle limit operation, the duty cycle of the on-time signal is increased to the target duty cycle at a slower speed over time.

Figure 8:
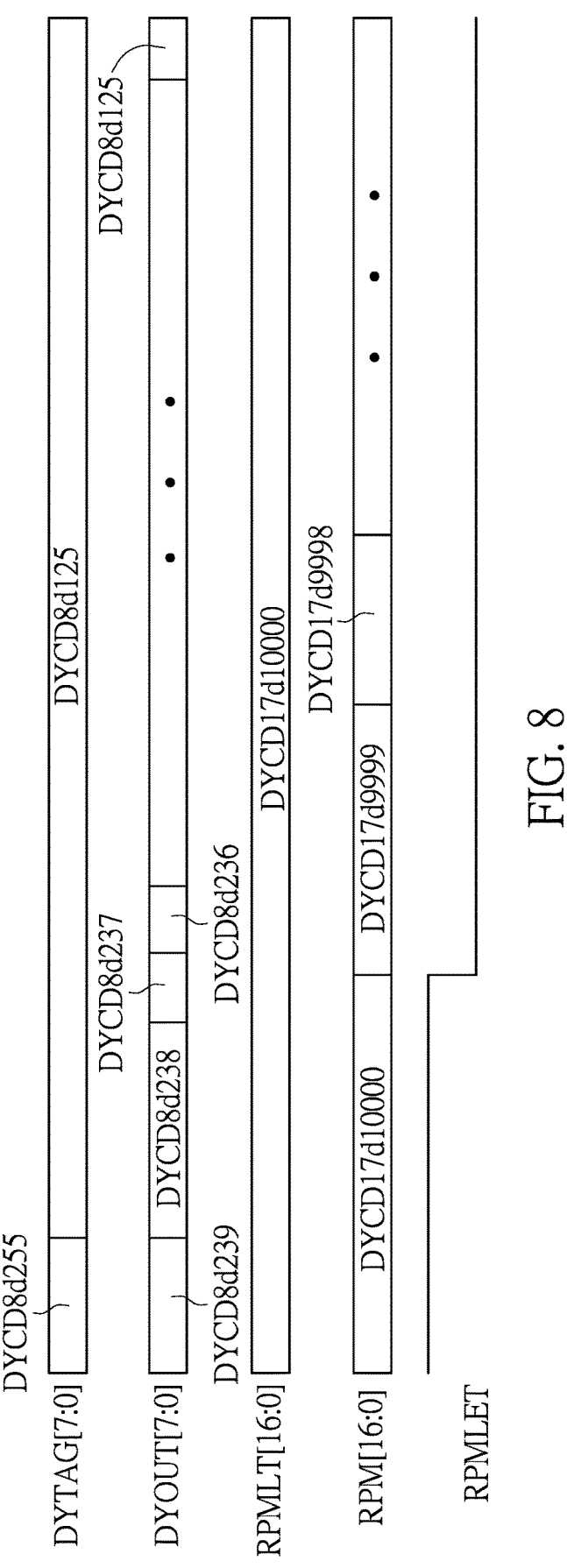
FIG. 8 is a schematic diagram of codes generated when a motor rotational speed control system having a duty cycle variable modulation mechanism enters a normal duty control mode from a rotational speed limit modulation mode according to a seventh embodiment of the present disclosure.

Reference is made to FIG. 8, which is a schematic diagram of codes generated when a motor rotational speed control system having a duty cycle variable modulation mechanism enters a normal duty control mode from a rotational speed limit modulation mode according to a seventh embodiment of the present disclosure.

The target limit comparing circuit 1011 of the control circuit 101 of the motor rotational speed control system of the present disclosure as shown in FIG. 3 may receive the target duty cycle command DYTAG including the code representing the target duty cycle from the external target limiting circuit. For example, as shown in FIG. 8, the target limit comparing circuit 1011 receives the code "DYCD8d255" representing the target duty cycle being equal to a first specific target duty cycle within one of the plurality of time intervals, and receives a code "DYCD8d125" representing the target duty cycle being equal to a second specific target duty cycle within a next one of the plurality of time intervals.

The target limit comparing circuit 1011 of the control circuit 101 may store the lookup table on which the plurality of target duty cycles and the plurality of codes that respectively represent the plurality of target duty cycles are listed. The target limit comparing circuit 1011 of the control circuit 101 may determine which one of the plurality of target duty cycles on the lookup table is equal to the target duty cycle (%) instructed by the target duty cycle command DYTAG from the external target limiting circuit, and then look for one of the plurality of codes that represents the one of the plurality of target duty cycles on the lookup table.

The plurality of duty cycles DYOUT of the on-time signal that are sequentially outputted to the output stage circuit 103 within the plurality of intervals are respectively represented by codes "DYCD8d239", "DYCD8d238", "DYCD8d237"

and "DYCD8d236" to "DYCD8d125", and are fed back to the target limit comparing circuit 1011 of the control circuit 101.

The target limit comparing circuit 1011 of the control circuit 101 of the motor rotational speed control system of the present disclosure as shown in FIG. 3 may receive the rotational speed limit command including a code representing the rotational speed limit value RPMLT such as the code "DYCD17d10000" as shown in FIG. 8 from the external target limiting circuit.

When the detected rotational speed RPM of the motor MT that is represented by the code from the rotational speed detector 200 received by the target limit comparing circuit 1011 is reduced to be equal to or smaller than the rotational speed limit value RPMLT represented by the code "DYCD17d10000", the target limit comparing circuit 1011 of the control circuit 101 outputs the duty cycle limit instruction signal RPMLET that transits from the high level to a low level for instructing to stop performing the duty cycle limit operation. When the duty cycle limit operation is not performed, the duty cycle of the on-time signal is increased to the target duty cycle at a faster speed over time.

In conclusion, the present disclosure provides the motor rotational speed control system and method having the duty cycle variable modulation mechanism. The motor rotational speed control system (including the rotational speed detector and the motor driver) of the present disclosure is capable of performing the motor rotational speed control method of the present disclosure. In the motor speed control method of the present disclosure, a hysteresis operation in which the rotational speed of the motor speed is limited to being unable to quickly reach the target speed is not performed. In the motor speed control method of the present disclosure, the duty cycle of each of the plurality of waveforms of the on-time signal used for driving the motor is modulated, and the duty cycle differences between the duty cycles of the plurality of waveforms of the on-time signal are modulated, with changes in various conditions and environmental factors. Therefore, the motor that is driven according to the motor speed control method of the present disclosure rotates stably.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor rotational speed control system having a duty cycle variable modulation mechanism, comprising:

a rotational speed detector connected to a motor, and configured to detect a rotational speed of the motor; and a motor driver connected to the rotational speed detector and the motor;

wherein, when the rotational speed of the motor that is detected by the rotational speed detector is larger than or equal to a set rotational speed, the motor driver, according to the rotational speed of the motor, modulates duty cycles of a plurality of waveforms that are sequentially generated in an on-time signal, and modulates a duty cycle difference between the duty cycle of each of the plurality of waveforms and the duty cycle of a previous one or every other one of the plurality of waveforms in the on-time signal;

wherein the motor driver, according to the on-time signal that is modulated, drives the motor such that the rotational speed of the motor is limited to be smaller than the set rotational speed;

wherein, when a current rotational speed of the motor is not larger than a rotational speed limit value, the motor driver maintains the duty cycle difference between the duty cycles of each subsequent two of the plurality of waveforms of the on-time signal to be equal to an initial duty cycle difference.

2. The motor rotational speed control system according to claim 1, wherein the motor driver, according to a target duty cycle command instructing a target duty cycle, modulates the duty cycle difference of the on-time signal to be equal to the initial duty cycle difference, and modulates the duty cycle of a latest one of the plurality of waveforms of the on-time signal to be equal to the target duty cycle.

3. The motor rotational speed control system according to claim 2, wherein, when the motor driver drives the motor according to one of the plurality of waveforms of the on-time signal, the motor driver determines a relationship between the current rotational speed of the motor and the rotational speed limit value, and accordingly determines whether to modulate the duty cycle differences between subsequent ones of the plurality of waveforms of the on-time signal.

4. The motor rotational speed control system according to claim 1, wherein, when the current rotational speed of the motor is larger than or equal to the rotational speed limit value, the motor driver sets the duty cycle difference between the duty cycles of each subsequent two of the plurality of waveforms of the on-time signal to be equal to a duty cycle modulation difference, and the duty cycle modulation difference is smaller than the initial duty cycle difference.

5. The motor rotational speed control system according to claim 4, wherein, when the motor driver drives the motor according to the on-time signal having the duty cycle difference being equal to the duty cycle modulation difference, the rotational speed detector detects the rotational speed of the motor.

6. The motor rotational speed control system according to claim 5, wherein, when the rotational speed of the motor that is driven according to the on-time signal having the duty cycle difference being equal to the duty cycle modulation difference by the motor driver is larger than or equal to the rotational speed limit value, the motor driver reduces the duty cycles of the subsequent ones of the plurality of waveforms of the on-time signal.

7. The motor rotational speed control system according to claim 6, wherein, when the rotational speed of the motor that is driven according to the on-time signal having the duty cycle difference being equal to the duty cycle modulation difference by the motor driver is not larger than the rotational speed limit value, the motor driver determines whether the duty cycle of one of the plurality of waveforms of the on-time signal that is currently used for driving the motor is equal to a target duty cycle.

8. The motor rotational speed control system according to claim 7, wherein, when the duty cycle of the one of the plurality of waveforms of the on-time signal that is currently used for driving the motor is equal to the target duty cycle, the motor driver does not further modulate the on-time signal.

9. The motor rotational speed control system according to claim 8, wherein, when the duty cycle of the one of the plurality of waveforms of the on-time signal that is currently used for driving the motor is not equal to the target duty cycle, the motor driver determines whether the duty cycle of the one of the plurality of waveforms of the on-time signal is larger than the target duty cycle.

10. The motor rotational speed control system according to claim 9, wherein, when the duty cycle of the one of the plurality of waveforms of the on-time signal that is currently used for driving the motor is larger than the target duty cycle, the motor driver reduces the duty cycles of the subsequent ones of the plurality of waveforms of the on-time signal for driving the motor.

11. The motor rotational speed control system according to claim 10, wherein, when the duty cycle of the one of the plurality of waveforms of the on-time signal that is currently used for driving the motor is not larger than the target duty cycle, the motor driver increases the duty cycles of the subsequent ones of the plurality of waveforms of the on-time signal for driving the motor.

12. The motor rotational speed control system according to claim 1, wherein the motor driver includes:

a control circuit connected to the rotational speed detector, wherein the motor driver, according to the rotational speed of the motor that is detected by the rotational speed detector, sets the duty cycle of each of the plurality of waveforms of the on-time signal, and sets the duty cycle difference between the duty cycle of each of the plurality of waveforms and the duty cycle of the previous one or every other one of the plurality of waveforms of the on-time signal, and outputs a control signal according to the on-time signal;

a driver circuit connected to control circuit, and configured to output the on-time signal according to the control signal from the control circuit; and an output stage circuit connected to the motor, and configured to drive the motor according to the on-time signal from the driver circuit.

13. The motor rotational speed control system according to claim 12, further comprising:

a rotor position detector circuit disposed on the motor and connected to the control circuit, wherein the rotor position detector circuit detects a position of a rotor of the motor to output a rotor position detected signal, and the control circuit controls the driver circuit to drive the motor according to the rotor position detected signal from the rotor position detector circuit.

14. The motor rotational speed control system according to claim 13, wherein the rotational speed detector is connected to the rotor position detector circuit, and configured to determine the rotational speed of the motor according to the rotor position detected signal from the rotor position detector circuit.

15. The motor rotational speed control system according to claim 1, wherein the motor is a single-phase motor.

16. The motor rotational speed control system according to claim 1, wherein the motor is a three-phase motor.

17. A motor rotational speed control method having a duty cycle variable modulation mechanism, comprising processes of:

(a) using a motor driver to drive a motor according to an on-time signal;

(b) receiving a target duty cycle command by the motor driver;

(c) setting, by the motor driver, a duty cycle of a latest one of a plurality of waveforms of the on-time signal to be equal to a target duty cycle instructed by the target duty cycle command;

(d) detecting a rotational speed of the motor by a rotational speed detector;

(e) determining, by the motor driver, whether or not the rotational speed of the motor is larger than or equal to a rotational speed limit value, in response to determining that the rotational speed of the motor is not larger than or equal to the rotational speed limit value, sequentially performing the processes (f) to (g) and then performing the process (l), and in response to determining that the rotational speed of the motor is larger than and not equal to the rotational speed limit value, sequentially performing the processes (h) to (j);

(f) modulating, by the motor driver, the duty cycle difference between the duty cycle of each of the plurality of waveforms that are generated in the on-time signal within each of a plurality of time intervals and the duty cycle of each of the plurality of waveforms that are generated in the on-time signal within a next one of the plurality of time intervals to be equal to an initial duty cycle difference;

(g) driving the motor according to the on-time signal having the duty cycle difference being equal to the initial duty cycle difference, by the motor driver;

(h) setting, by the motor driver, the duty cycle difference between the duty cycles of each subsequent two of the plurality of waveforms of the on-time signal to be equal to a duty cycle modulation difference, wherein the duty cycle modulation difference is smaller than the initial duty cycle difference;

(i) driving the motor according to the on-time signal having the duty cycle difference being equal to the duty cycle modulation difference, by the motor driver;

(j) determining, by the motor driver, whether or not the rotational speed of the motor is larger than or equal to the rotational speed limit value, in response to determining that the rotational speed of the motor is larger than or equal to the rotational speed limit value, performing the process (k), and in response to determining that the rotational speed of the motor is not larger than and not equal to the rotational speed limit value, performing the process (l);

(k) reducing the duty cycles of subsequent ones of the plurality of waveforms of the on-time signal for driving the motor, by the motor driver;

(l) determining, by the motor driver, whether or not the duty cycle of one of the plurality of waveforms of the on-time signal that is currently used for driving the motor is equal to a target duty cycle, in response to determining that the duty cycle of the one of the plurality of waveforms of the on-time signal is equal to the target duty cycle, not performing the process (m) in which the on-time signal is further modulated, and in response to determining that the duty cycle of the one of the plurality of waveforms of the on-time signal is not equal to the target duty cycle, performing the process (m); and (m) determining, by the motor driver, whether or not the duty cycle of the one of the plurality of waveforms of the on-time signal is larger than the target duty cycle, in response to determining that the duty cycle of the one of the plurality of waveforms of the on-time signal is larger than the target duty cycle, reducing the duty cycles of the subsequent ones of the plurality of waveforms of the on-time signal for driving the motor, and in response to determining that the duty cycle of the one of the plurality of waveforms of the on-time signal is not larger than the target duty cycle, increasing the duty cycles of the subsequent ones of the plurality of waveforms of the on-time signal for driving the motor.

* * * * *